US006635726B2

(12) United States Patent
Farrer et al.

(10) Patent No.: US 6,635,726 B2
(45) Date of Patent: Oct. 21, 2003

(54) PROCESS FOR THE POLYMERIZATION OF ETHYLENE AND INTERPOLYMERS THEREOF

(75) Inventors: Don Kent Farrer, Longview, TX (US); Kenneth Alan Dooley, Longview, TX (US); Glenn Edward Moore, Longview, TX (US); Larry Allen Noble, Longview, TX (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 09/912,141

(22) Filed: Jul. 24, 2001

(65) Prior Publication Data

US 2003/0027951 A1 Feb. 6, 2003

(51) Int. Cl.⁷ .................................................. C08F 4/42
(52) U.S. Cl. ........................ 526/144; 526/901; 526/903; 526/158; 526/124.3; 526/125.2; 526/352; 526/348; 502/128; 502/103
(58) Field of Search ................. 526/144, 901, 526/903, 158, 124.3, 125.2, 352, 348; 502/128, 103

(56) References Cited

U.S. PATENT DOCUMENTS

| 3,354,139 | A |   | 11/1967 | Vandenberg |
| 3,709,853 | A |   | 1/1973  | Karapinka |
| 4,003,712 | A |   | 1/1977  | Miller |
| 4,011,382 | A |   | 3/1977  | Levine et al. |
| 4,012,573 | A |   | 3/1977  | Trieschmann et al. |
| 4,302,566 | A |   | 11/1981 | Karol et al. |
| 4,543,399 | A |   | 9/1985  | Jenkins, III et al. |
| 4,593,010 | A |   | 6/1986  | Malpass |
| 4,657,998 | A |   | 4/1987  | Malpass |
| 4,882,400 | A |   | 11/1989 | Dumain et al. |
| 5,118,769 | A |   | 6/1992  | Kondo et al. |
| 5,352,749 | A |   | 10/1994 | DeChellis et al. |
| 5,541,270 | A |   | 7/1996  | Chinh et al. |
| 5,863,995 | A | * | 1/1999  | Daire .......................... 526/144 |
| 5,990,251 | A | * | 11/1999 | Grlus ....................... 526/125.7 |
| 6,191,239 | B1| * | 2/2001  | Ford et al. ................ 526/123.1 |
| 6,228,957 | B1| * | 5/2001  | Ford et al. ................ 526/123.1 |

FOREIGN PATENT DOCUMENTS

| EP | 0230707 A2 | 8/1987 |
| EP | 0529977 B1 | 3/1993 |
| EP | 0703246 A1 | 9/1994 |
| EP | 0703246 A1 | 3/1996 |
| EP | 0870773 A1 | 10/1998 |
| WO | WO 0058371 A1 | 10/1999 |
| WO | WO 0058371 A1 | 10/2000 |
| WO | WO 0075202 A1 | 12/2000 |
| WO | WO 0228919 A1 | 4/2002 |

OTHER PUBLICATIONS

"Group Notation Revised in Periodic Table," Chemical & Engineering News, 1985, p. 27, vol. 63, Issue 5.

* cited by examiner

Primary Examiner—Ling-Sui Choi
(74) Attorney, Agent, or Firm—Steven A. Owen; Bernie Graves

(57) ABSTRACT

A novel continuous gas phase polymerization process for producing polyethylene and interpolymers of ethylene and at least one other olefin is provided wherein chloroform is used in a specified amount such that the activity of the titanium containing Ziegler-Natta catalyst is increased.

17 Claims, No Drawings

PROCESS FOR THE POLYMERIZATION OF ETHYLENE AND INTERPOLYMERS THEREOF

FIELD OF INVENTION

The present invention relates to a continuous gas phase polymerization process for producing polyethylene and interpolymers of ethylene and at least one other olefin comprising introducing into a polymerization medium ethylene or ethylene and other olefin(s), a Ziegler-Natta catalyst comprising a titanium component and a co-catalyst component, and chloroform wherein the chloroform is present in a molar ratio of chloroform to the titanium component of the Ziegler-Natta catalyst from 0.4:1 to about 3.5:1.

BACKGROUND OF INVENTION

The use of halogenated hydrocarbons with titanium containing Ziegler-Natta catalysts for the production of polyethylene is disclosed in U.S. Pat. Nos. 5,863,995; 5,990,251; 4,657,998 and 3,354,139. In general it is disclosed that the halogenated hydrocarbons may reduce the rate of ethane formation, control the molecular weight of the polyethylene, produce polyethylenes with broad molecular weight distributions, or provide other effects.

In U.S. Pat. No. 5,990,251 it is disclosed that halogenated hydrocarbons are used, in a polymerization process for producing polyethylene utilizing a titanium based Ziegler-Natta catalyst, for increasing the catalyst activity in the polymerization. It is further stated that the amount of halogenated hydrocarbon must be present in a molar ratio of halogenated hydrocarbon to titanium of the Ziegler-Natta catalyst from 0.001 to 0.15. Furthermore it is disclosed that when the molar ratio of halogenated hydrocarbon to titanium is too high, the activity of the catalyst is not appreciably modified or is substantially reduced in a continuous polymerization process. It is also stated that when the molar ratio is too low, the catalyst activity is not substantially modified.

In U.S. Pat. No. 5,863,995 there is also reference to catalytic activity in a process for producing polyethylene using a titanium containing Ziegler-Natta catalyst and a halogenated hydrocarbon in a specified amount. The patent states that the halogenated hydrocarbon is present in a molar ratio of halogenated hydrocarbon to the titanium in the catalyst of 0.01 to 1.8. It is further stated that the specified quantity of halogenated hydrocarbon results in no substantial variation of the average activity of the catalyst.

In U.S. Pat. No. 3,354,139 there is disclosed the use of halogenated hydrocarbons with a Ziegler-Natta catalyst to control the molecular weight of polyethylene prepared in a solution or slurry polymerization process.

In U.S. Pat. No. 4,657,998 there is disclosed a catalyst system comprising titanium containing catalyst component, isoprenylaluminum and a halohydrocarbon for the production of polyethylene having a broad molecular weight distribution.

SUMMARY OF THE INVENTION

Applicants have unexpectedly found that in a continuous gas phase polymerization process for producing polyethylene and interpolymers of ethylene and at least one other olefin comprising introducing into a polymerization medium the ethylene or ethylene and at least one other olefin, a Ziegler-Natta catalyst comprising a titanium component and a co-catalyst component, and chloroform wherein chloroform is present in a molar ratio of chloroform to the titanium component of the Ziegler-Natta catalyst from 0.4:1 to about 3.5:1, the activity of the catalyst is increased as compared with a process carried out in the absence of chloroform.

DETAILED DESCRIPTION OF THE INVENTION

Applicants have unexpectedly found that in a continuous gas phase polymerization process for producing polyethylene and interpolymers of ethylene and at least one other olefin comprising introducing into a polymerization medium the ethylene or ethylene and at least one other olefin, a Ziegler-Natta catalyst comprising a titanium component and a co-catalyst component, and chloroform wherein chloroform is present in a molar ratio of chloroform to the titanium component of the Ziegler-Natta catalyst from 0.4:1 to about 3.5:1, the activity of the catalyst is increased as compared with a process carried out in the absence of chloroform.

The continuous gas phase polymerization process for producing ethylene and interpolymers of ethylene and at least one other olefin may be carried out using any suitable continuous gas phase polymerization process. These types of processes and means for operating the polymerization reactors are well known and completely described in U.S. Pat. Nos. 3,709,853; 4,003,712; 4,011,382; 4,012,573; 4,302,566; 4,543,399; 4,882,400; 5,352,749 and 5,541,270. These patents disclose gas phase polymerization processes wherein the polymerization zone is either mechanically agitated or fluidized by the continuous flow of the gaseous monomer and diluent. The entire contents of these patents are incorporated herein by reference.

The polymerization process of the present invention is effected as a continuous gas phase process such as, for example, a gas phase fluid bed process. A fluid bed reactor for use in the process of the present invention typically comprises a reaction zone and a so-called velocity reduction zone. The reaction zone comprises a bed of growing polymer particles, formed polymer particles and a minor amount of catalyst particles fluidized by the continuous flow of the gaseous monomer and diluent to remove heat of polymerization through the reaction zone. Optionally, some of the recirculated gases may be cooled and compressed to form liquids that increase the heat removal capacity of the circulating gas stream when readmitted to the reaction zone. A suitable rate of gas flow may be readily determined by simple experiment. Make up of gaseous monomer to the circulating gas stream is at a rate equal to the rate at which particulate polymer product and monomer associated therewith is withdrawn from the reactor and the composition of the gas passing through the reactor is adjusted to maintain an essentially steady state gaseous composition within the reaction zone. The gas leaving the reaction zone is passed to the velocity reduction zone where entrained particles are removed. Finer entrained particles and dust may be removed in a cyclone and/or fine filter. The said gas is compressed in a compressor, passed through a heat exchanger wherein the heat of polymerization and the heat of compression are removed, and then returned to the reaction zone.

In more detail, the reactor temperature of the fluid bed process ranges from about 30° C. to about 130° C. In general, the reactor temperature is operated at the highest temperature that is feasible taking into account the sintering temperatures of the polymer product within the reactor.

The process of the present invention is suitable for the polymerization of ethylene and interpolymers of ethylene with at least one or more other olefins. The other olefins, for example, may contain from 3 to 16 carbon atoms. Included herein are homopolymers of ethylene and interpolymers of ethylene and the other olefin(s). The interpolymers include interpolymers of ethylene and at least one olefin(s) wherein the ethylene content is at least about 50% by weight of the total monomers involved. Exemplary olefins that may be utilized herein are propylene, 1-butene, 1-pentene, 1-hexene, 1-heptene, 1-octene, 4-methyl-1-pentene, 1-decene, 1-dodecene, 1-hexadecene and the like. Also utilizable herein are non-conjugated dienes and olefins formed in situ in the polymerization medium. When olefins are formed in situ in the polymerization medium, the formation of interpolymers of ethylene containing long chain branching may occur.

The Ziegler-Natta catalysts utilized herein are well known in the industry. The Ziegler-Natta catalysts in the simplest form are comprised of a titanium component and a co-catalyst component comprising at least one organometallic compound. In the process of the present invention, the components of the catalyst can be introduced in any manner known in the art. For example, the catalyst components can be introduced directly into the fluidized bed reactor in the form of a solution, a slurry or a dry free flowing powder. The catalyst can also be used in the form of a deactivated catalyst, or in the form of a prepolymer obtained by contacting the titanium component with one or more olefins in the presence of a co-catalyst. The Ziegler-Natta catalyst can optionally contain magnesium and/or chlorine. Such magnesium and chlorine containing catalysts may be prepared by any manner known in the art.

The co-catalyst component of the Ziegler-Natta catalyst used in the process of the present invention can be any organometallic compound, or mixtures thereof, that can activate the titanium metal component of the Ziegler-Natta catalyst in the polymerization of ethylene homopolymers and interpolymers. In particular, the organometallic co-catalyst compound that is reacted with the titanium component contains a metal selected from Groups 1, 2, 11, 12, 13 and/or 14 of the Periodic Table of the Elements as published in "Chemical and Engineering News", 63(5), 27, 1985. In this format, the groups are numbered 1–18. Exemplary of such metals are lithium, magnesium, copper, zinc, aluminum, silicon and the like, or mixtures thereof.

Preferred for use herein are the organoaluminum compounds such as the trialkylaluminum compounds and dialkylaluminum monohalides. Examples include trimethylaluminum, triethylaluminum, trihexylaluminum, dimethylaluminum chloride, and diethylaluminum chloride.

The titanium component, with or without co-catalyst, may be deposited on a carrier. In so doing, there may be used as the carrier any catalyst carrier compound known in the art. Exemplary carriers are magnesium oxides, magnesium oxyhalides and magnesium halides, particularly magnesium chloride. The catalyst, with or without the carrier, may be supported on a solid porous support, such as silica, alumina and the like.

The Ziegler-Natta catalyst may contain conventional components in addition to the titanium component and the organometallic co-catalyst component. For example, there may be added any internal or external electron donor(s) known in the art, and the like.

The Ziegler-Natta catalyst may be prepared by any method known in the art. The catalyst can be in the form of a solution, a slurry or a dry free flowing powder. The amount of Ziegler-Natta catalyst used is that which is sufficient to allow production of the desired amount of polymeric material.

The polymerization reaction is carried out in the presence of chloroform, present in a molar ratio of chloroform to the titanium of the Ziegler-Natta catalyst from 0.4:1 to about 3.5:1. Preferably the chloroform is present in a molar ratio ranging from about 0.5:1 to about 3:1, and more preferably from about 1:1 to about 2:1.

The chloroform may be introduced into the polymerization medium as such, or diluted in a liquid hydrocarbon such as an alkane for example, propane, n-butane, isobutane, n-pentane, isopentane, hexane, cyclohexane, heptane, octane and the like.

In carrying out the polymerization reaction of the present process there may be added other conventional additives generally utilized in processes for polymerizing olefins.

Any conventional additive may be added to the polyethylenes obtained by the present invention. Examples of the additives include nucleating agents, heat stabilizers, antioxidants of phenol type, sulfur type and phosphorus type, lubricants, antistatic agents, dispersants, copper harm inhibitors, neutralizing agents, foaming agents, plasticizers, anti-foaming agents, flame retardants, crosslinking agents, flowability improvers such as peroxides, ultraviolet light absorbers, light stabilizers, weathering stabilizers, weld strength improvers, slip agents, anti-blocking agents, anti-fogging agents, dyes, pigments, natural oils, synthetic oils, waxes, fillers and rubber ingredients.

The polyethylenes of the present invention may be fabricated into films by any technique known in the art. For example, films may be produced by the well known cast film, blown film and extrusion coating techniques.

Further, the polyethylenes may be fabricated into other articles of manufacture, such as molded articles, by any of the well known techniques.

The invention will be more readily understood by reference to the following examples. There are, of course, many other forms of this invention which will become obvious to one skilled in the art, once the invention has been fully disclosed, and it will accordingly be recognized that these examples are given for the purpose of illustration only, and are not to be construed as limiting the scope of this invention in any way.

EXAMPLES

In the following examples the test procedures listed below were used in evaluating the analytical properties of the polyethylenes and in evaluating the physical properties of the films of the examples.

a) Density is determined according to ASTM D-4883 from a plaque made according to ASTM D1928;

b) Melt Index (MI), $I_2$, is determined in accord with ASTM D-1238, condition E, measured at 190° C., and reported as decigrams per minute;

c) High Load Melt Index (HLMI), $I_{21}$, is measured in accord with ASTM D-1238, Condition F, measured at 10.0 times the weight used in the melt index test above;

d) Melt Flow Ratio (MFR)=$I_{21}/I_2$ or High Load Melt Index/Melt Index; and e) Residual Titanium Content in the Product. The residual titanium content in the product is measured by X-Ray Fluorescence Spectroscopy (XRF) using a Philips Sequential X-Ray Spectrometer Model PW 1480. The samples of the polymer to be evaluated were compression molded into a circular shaped plaque approximately 43 mm in diameter so as to fit the sample holder on the spectrometer and 3 to 5 mm in thickness and having a smooth flat surface. The molded test specimens were then placed in the XRF unit and the x-ray fluorescence arising from the titanium in the test specimen was measured. The residual titanium content was then determined based on a calibration curve obtained by measurements from polyethylene calibration specimens containing a known amount of titanium. The residual titanium content is reported as parts per million (ppm) relative to the polymer matrix.

f) The productivity of the catalyst or prepolymer (Productivity) is the ratio of pounds of polyethylene produced per pound of catalyst or prepolymer added to the reactor.

g) The activity of the catalyst is expressed as grams of polyethylene per millimole titanium per hour of reaction and per 0.1 MPa of ethylene partial pressure [g PE·(mM Ti)$^{-1}$·h$^{-1}$·(0.1 MPa)$^{-1}$].

The transition metal component of the Ziegler-Natta catalyst used in Examples 1–4 herein was prepared in accordance with Example 1-a of European Patent Application EP 0 703 246 A1. The Ziegler-Natta catalyst was used in prepolymer form, and was prepared in accordance with Example 1-b of European Patent Application EP 0 703 246 A1. A prepolymer containing about 35.7 grams of polyethylene per millimole of titanium, with a tri-n-octylaluminum (TnOA) to titanium molar ratio of about 1.0, was thus obtained.

The continuous polymerization process utilized in Examples 1–4 herein was carried out in a fluidized-bed reactor for gas-phase polymerization, consisting of a vertical cylinder of diameter 0.74 meters and height 7 meters and surmounted by a velocity reduction chamber. The reactor was provided in its lower part with a fluidization grid and with an external line for recycling gas, which connects the top of the velocity reduction chamber to the lower part of the reactor, at a point below the fluidization grid. The recycling line was equipped with a compressor for circulating gas and a heat transfer means such as a heat exchanger. In particular the lines for supplying ethylene, 1-hexene, hydrogen and nitrogen, which represent the main constituents of the gaseous reaction mixture passing through the fluidized bed, feed into the recycling line.

Above the fluidization grid, the reactor contained a fluidized bed ranging from about 270 kilograms to 450 kilograms consisting of a low-density polyethylene powder made up of particles with a weight-average diameter of about 0.7 mm. The gaseous reaction mixture, which contained ethylene, 1-hexene, hydrogen, nitrogen and minor amounts of other components, passed through the fluidized bed under a pressure ranging from about 290 psig (2.0 Mpa) to about 300 psig (2.1 MPa) with an ascending fluidization speed of about 1.7 feet per second (52 cm per second).

In Examples 1–4 a catalyst was introduced intermittently into the reactor, the said catalyst comprising magnesium, chlorine and titanium and having been converted beforehand to a prepolymer, as described above, containing about 35.7 grams of polyethylene per millimole of titanium and an amount of tri-n-octylaluminum (TnOA) such that the molar ratio, Al/Ti, was equal to about 1.0. The rate of introduction of the prepolymer into the reactor was adjusted to achieve the desired production rate. During the polymerization, a solution of trimethylaluminum (TMA) in n-hexane, at a concentration of about 2 weight percent, was introduced continuously into the line for recycling the gaseous reaction mixture, at a point situated downstream of the heat transfer means. The feed rate of TMA is expressed as a molar ratio of TMA to titanium (TMA/Ti), and is defined as the ratio of the TMA feed rate (in moles of TMA per hour) to the prepolymer feed rate (in moles of titanium per hour). Simultaneously, a solution of tetrahydrofuran (THF) in n-hexane, at a concentration of about 1 weight percent, was introduced continuously into the line for recycling the gaseous reaction mixture. The feed rate of THF is expressed as a molar ratio of THF to titanium (THF/Ti), and is defined as the ratio of the THF feed rate (in moles of THF per hour) to the prepolymer feed rate (in moles of titanium per hour). Dinitrogen monoxide ($N_2O$) was added as a gas to the line for recycling the gaseous reaction mixture. The concentration of $N_2O$ in the gas phase polymerization medium is expressed in units of parts per million (ppm) by volume.

In Examples 1–4 a solution of chloroform ($CHCl_3$) in n-hexane, at a concentration of about 0.5 weight percent, was introduced continuously into the line for recycling the gaseous reaction mixture. The feed rate of $CHCl_3$ is expressed as a molar ratio of $CHCl_3$ to titanium ($CHCl_3$/Ti), and is defined as the ratio of the $CHCl_3$ feed rate (in moles of $CHCl_3$ per hour) to the prepolymer feed rate (in moles of titanium per hour). The $CHCl_3$ was added as a solution in n-hexane to the line for recycling the gaseous reaction mixture.

Example 1

The continuous gas phase process conditions are given in Table 1 and the resin properties are given in Table 2. The molar ratio TMA/Ti was 7. The molar ratio $CHCl_3$/Ti was 0.5. The molar ratio THF/Ti was 0.3. The concentration of dinitrogen monoxide ($N_2O$) in the polymerization medium was 305 ppm by volume. 1-Hexene was used as comonomer. Under these conditions a polyethylene free from agglomerate was withdrawn from the reactor at a rate of 189 lb/h (85.7 kg/h). The productivity of the prepolymer was 220 kilograms of polyethylene per kilogram of prepolymer which corresponds to an activity of 165 [g PE·(mM Ti)$^{-1}$·h$^{-1}$·(0.1 MPa)$^{-1}$].

The polyethylene had a density of 0.917 g/cc, a melt index $MI_{2.16}$, $I_2$, of 0.9 dg/min and a Melt Flow Ratio, $I_{21}/I_2$, of 27.

Example 2

The continuous gas phase process conditions are given in Table 1 and the resin properties are given in Table 2. The molar ratio TMA/Ti was 7. The molar ratio $CHCl_3$/Ti was 1.5. The molar ratio THF/Ti was 0.3. The concentration of dinitrogen monoxide ($N_2O$) in the polymerization medium was 332 ppm by volume. 1-Hexene was used as comonomer. Under these conditions a polyethylene free from agglomerate was withdrawn from the reactor at a rate of 215 lb/h (97.5 kg/h). The productivity of the prepolymer was 242 kilograms of polyethylene per kilogram of prepolymer which corresponds to an activity of 205 [g PE·(mM Ti)$^{-1}$·h$^{-1}$·(0.1 MPa)$^{-1}$].

The polyethylene had a density of 0.917 g/cc, a melt index $MI_{2.16}$, $I_2$, of 0.9 dg/min and a Melt Flow Ratio, $I_{21}/I_2$, of 27.

Example 3

The continuous gas phase process conditions are given in Table 1 and the resin properties are given in Table 2. The molar ratio TMA/Ti was 7. The molar ratio $CHCl_3$/Ti was 2.0. The molar ratio THF/Ti was 0.3. The concentration of dinitrogen monoxide ($N_2O$) in the polymerization medium was 315 ppm by volume. 1-Hexene was used as comonomer. Under these conditions a polyethylene free from agglomerate was withdrawn from the reactor at a rate of 218 lb/h (98.9 kg/h). The productivity of the prepolymer was 269 kilograms of polyethylene per kilogram of prepolymer which corresponds to an activity of 240 [g PE·(mM Ti)$^{-1}$·h$^{-1}$·(0.1 MPa)$^{-1}$].

The polyethylene had a density of 0.917 g/cc, a melt index MI$_{2.16}$, I$_2$, of 0.8 dg/min and a Melt Flow Ratio, I$_{21}$/I$_2$, of 27.

TABLE 1

Reactor Conditions for Examples 1 through 3

|  | Example | | |
| --- | --- | --- | --- |
|  | 1 | 2 | 3 |
| Reactor Pressure, psig (MPa) | 299 (2.06) | 293 (2.02) | 293 (2.02) |
| Reactor Temperature, °C. | 86 | 86 | 86 |
| Fluidized Bulk Density, lb/ft$^3$ (g/cm$^3$) | 15.8 (0.253) | 16.3 (0.261) | 16.1 (0.258) |
| Reactor Bed Height, ft (meter) | 11.5 (3.51) | 11.3 (3.44) | 11.0 (3.35) |
| Ethylene, mole % | 50.0 | 50.6 | 50.6 |
| H$_2$/C$_2$[1] | 0.093 | 0.093 | 0.092 |
| C$_6$/C$_2$[2] | 0.118 | 0.112 | 0.112 |
| TMA/Ti[3] | 7 | 7 | 7 |
| CHCl$_3$/Ti[4] | 0.5 | 1.5 | 2.0 |
| THF/Ti[5] | 0.3 | 0.3 | 0.3 |
| N$_2$O, ppm by volume | 305 | 332 | 315 |
| Prepolymer Rate, lb/h (kg/h) | 0.86 (0.39) | 0.89 (0.40) | 0.81 (0.37) |
| Production Rate, lb/h (kg/h) | 189 (85.7) | 215 (97.5) | 218 (98.9) |
| Space Time Yield, kg/h-m$^3$ | 57.5 | 66.6 | 69.2 |
| Productivity, mass ratio | 220 | 242 | 269 |
| Activity[6] | 165 | 205 | 240 |
| Residual Titanium, ppm | 6.1 | 5.5 | 5.0 |

[1]hydrogen to ethylene molar ratio;
[2]1-hexene to ethylene molar ratio;
[3]trimethylaluminum to titanium molar ratio;
[4]chloroform to titanium molar ratio;
[5]tetrahydrofuran to titanium molar ratio;
[6]units of grams PE · (mmole Ti)$^{-1}$ · h$^{-1}$ · (0.1 MPa)$^{-1}$]

TABLE 2

Resin Properties for LLDPE prepared in Examples 1 through 3

|  | Example | | |
| --- | --- | --- | --- |
|  | 1 | 2 | 3 |
| Density (g/cc) | 0.917 | 0.917 | 0.917 |
| Melt Index, I$_2$ (dg/min) | 0.9 | 0.9 | 0.8 |
| Melt Flow Ratio (I$_{21}$/I$_2$) | 26.6 | 26.6 | 26.6 |

Example 4

The process of Example 3 was followed with the following exceptions:

1. the ethylene concentration in the reactor loop was maintained at 50.0 mole %,
2. the molar ratio of hydrogen to ethylene was set to 0.130,
3. the molar ratio of 1-hexene to ethylene was set to 0.110,
4. the prepolymer addition rate was fixed at 0.80 pounds per hour (0.36 kg/h),
5. the TMA to titanium molar ratio was set to 4,
6. the dinitrogen monoxide (N$_2$O) in the polymerization medium was maintained at 300 ppm by volume, and
7. the molar ratio of chloroform to titanium was varied.

The molar ratio of chloroform to titanium as shown in Runs A, B, C and D of Table 3 was present in amounts of 2.0:1; 3.0:1; 3.5:1; and 0:1. At each of the four molar ratios of chloroform to titanium the activity of the catalyst was determined and reported.

TABLE 3

| Run | CHCl$_3$/Ti[1] | Activity[2] |
| --- | --- | --- |
| A | 2:1 | 250 |
| B | 3:1 | 160 |
| C | 3.5:1 | 90 |
| D (comparative) | 0 | 75 |

[1]Molar ratio of chloroform to titanium;
[2]units of [g PE · (mM Ti)$^{-1}$ · h$^{-1}$ · (0.1 MPa)$^{-1}$]

Under each of these conditions a polyethylene free from agglomerate was withdrawn from the reactor.

From the above data in Examples 1–4 and Tables 1, 2 and 3 the following observations may be made. The addition of chloroform (CHCl$_3$) in a molar ratio of 0.5:1 to 3.5:1 provides an increase in catalyst activity as compared with a process carried out in the absence of chloroform.

It should be clearly understood that the forms of the invention herein described are illustrative only and are not intended to limit the scope of the invention. The present invention includes all modifications falling within the scope of the following claims.

We claim:

1. A process for increasing catalyst activity in a continuous gas phase process for polymerizing ethylene or ethylene and at least one or more other olefin(s) comprising contacting, under polymerization conditions, the ethylene or ethylene and at least one or more other olefin(s) with a Ziegler-Natta catalyst comprising a titanium component and a co-catalyst component, and chloroform wherein chloroform is present in a molar ratio of chloroform to the titanium component of the Ziegler-Natta catalyst from 0.4:1 to about 3.5:1.

2. The process according to claim 1 wherein the molar ratio of chloroform to the titanium component of the Ziegler-Natta catalyst is from about 0.5:1 to about 3:1.

3. The process according to claim 1 wherein the molar ratio of chloroform to the titanium component of the Ziegler-Natta catalyst is from about 1:1 to about 2:1.

4. A process for increasing catalyst activity in a continuous gas phase process for polymerizing ethylene or ethylene and at least one or more other olefin(s) comprising contacting, under polymerization conditions, the ethylene or ethylene and at least one or more other olefin(s) with a Ziegler-Natta catalyst comprising a titanium component and a co-catalyst component, and chloroform wherein chloroform is present in a molar ratio of chloroform to the titanium component of the Ziegler-Natta catalyst from 1.1:1 to about 3.5:1.

5. The process according to claim 1 wherein said molar ratio of chloroform to the titanium component of the Ziegler-Natta catalyst is from about 1.5:1 to about 3:1.

6. The process according to claim 1 wherein said molar ratio of chloroform to the titanium component of the Ziegler-Natta catalyst is from about 1.5:1 to about 2:1.

7. The process according to claim 1 wherein said molar ratio of chloroform to the titanium component of the Ziegler-Natta catalyst is from about 2:1 to about 3:1.

8. The process according to claim 1 wherein said molar ratio of choroform to the titanium component of the Ziegler-Natta catalyst is from about 2:1 to about 3.5:1.

9. The process according to claim 4 wherein said molar ratio of chloroform to the titanium component of the Ziegler-Natta catalyst is from 0.4:1 to about 3.5:1; wherein said catalyst activity is increased over the entire molar range as compared to a Ziegler-Natta catalyst without said chloroform.

10. The process according to claim 4 wherein said molar ratio of chloroform to the titanium component of the Ziegler-Natta catalyst is from about 0.5:1 to about 3:1; wherein said catalyst activity is increased over the entire molar range as compared to a Ziegler-Natta catalyst without said chloroform.

11. The process according to claim 4 wherein said molar ratio of chloroform to the titanium component of the Ziegler-Natta catalyst is from about 1:1 to about 2:1; wherein said catalyst activity is increased over the entire molar range as compared to a Ziegler-Natta catalyst without said chloroform.

12. The process according to claim 4 wherein said molar ratio of chloroform to the titanium component of the Ziegler-Natta catalyst is from about 2:1 to about 3:1; wherein said catalyst activity is increased over the entire molar range as compared to a Ziegler-Natta catalyst without said chloroform.

13. The process according to claim 4 wherein said molar ratio of chloroform to the titanium component of the Ziegler-Natta catalyst is from about 2:1 to about 3.5:1 wherein said catalyst activity is increased over the entire molar range as compared to a Ziegler-Natta catalyst without said chloroform.

14. A process for increasing catalyst activity in a continuous gas phase process for polymerizing ethylene or ethylene and at least one or more other olefin(s) consisting essentially of contacting, under polymerization conditions, the ethylene or ethylene and at least one or more other olefin(s) with a Ziegler-Natta catalyst comprising a titanium component and a co-catalyst component, and chloroform wherein chloroform is present in a molar ratio of chloroform to the titanium component of the Ziegler-Natta catalyst from 0.4:1 to about 3.5:1.

15. The process according to claim 14 wherein said molar ratio of chloroform to the titanium component of the Ziegler-Natta catalyst is from about 0.5:1 to about 3:1.

16. The process according to claim 14 wherein said molar ratio of chloroform to the titanium component of the Ziegler-Natta catalyst is from about 1:1 to about 2:1.

17. The process according to claim 14 wherein said molar ratio of chloroform to the titanium component of the Ziegler-Natta catalyst is from about 2:1 to about 3:1.

* * * * *

UNITED STATES PATENT AND TRADEMARK OFFICE
CERTIFICATE OF CORRECTION

PATENT NO. : 6,635,726 B2  
DATED : October 21, 2003  
INVENTOR(S) : Farrer et al.

It is certified that error appears in the above-identified patent and that said Letters Patent is hereby corrected as shown below:

Column 8,
Line 65, "according to claim 4" should be -- according to claim 1 --.

Column 9,
Lines 4, 10, 16 and 22, "according to claim 4" should be -- according to claim 1 --.

Signed and Sealed this

Sixth Day of April, 2004

JON W. DUDAS
*Acting Director of the United States Patent and Trademark Office*